United States Patent [19]
Lalonde et al.

[11] Patent Number: 5,283,731
[45] Date of Patent: Feb. 1, 1994

[54] COMPUTER-BASED CLASSIFIED AD SYSTEM AND METHOD

[75] Inventors: James E. Lalonde, Seattle; Terry R. Dettmann, Kirkland, both of Wash.

[73] Assignee: EC Corporation, Seattle, Wash.

[21] Appl. No.: 995,798

[22] Filed: Dec. 23, 1992

Related U.S. Application Data

[63] Continuation-in-part of Ser. No. 819,484, Jan. 19, 1992.

[51] Int. Cl.⁵ ............... G06F 15/22; G06F 15/24; G06G 7/52; H04M 1/64
[52] U.S. Cl. ................... 364/401; 379/67; 379/71; 379/88
[58] Field of Search ........... 364/400, 401; 379/67, 379/71, 88, 89; 395/600

[56] References Cited

U.S. PATENT DOCUMENTS

| | | | |
|---|---|---|---|
| 3,573,747 | 4/1971 | Adams et al. | 364/408 |
| 4,429,385 | 1/1984 | Cichelli et al. | 370/92 |
| 4,577,062 | 3/1986 | Hilleary et al. | 379/88 |
| 4,645,873 | 2/1987 | Chomet | 379/93 |
| 4,649,563 | 3/1987 | Riskin | 379/97 |
| 4,757,267 | 7/1988 | Riskin | 379/113 |
| 4,817,129 | 3/1989 | Riskin | 379/88 |
| 4,847,890 | 7/1989 | Solomon et al. | 379/67 |
| 4,878,239 | 10/1989 | Solomon et al. | 379/67 |
| 4,907,274 | 3/1990 | Nomura et al. | 380/30 |
| 4,969,185 | 11/1990 | Dorset et al. | 379/209 |
| 5,058,152 | 10/1991 | Solomon et al. | 379/67 |
| 5,077,665 | 12/1991 | Silverman et al. | 364/408 |
| 5,136,501 | 8/1992 | Silverman et al. | 364/408 |
| 5,177,780 | 1/1993 | Kasper et al. | 379/59 |
| 5,193,110 | 3/1993 | Jones et al. | 379/94 |

FOREIGN PATENT DOCUMENTS

90/1098  9/1990  PCT Int'l Appl. .

OTHER PUBLICATIONS

Weissenstein; "Baby Bells Smell Business Marketing Opportunities in Wake of Ruling"; *Business Marketing*; Sep. 1991; p. 2, Dialog #03329155.

Fike, John L., *Understanding Telephone Electronics*, (1983) pp. iv, 1-1, 9-1, 10-1.

"MSO Plans Court Appeal; N. M Regulators Slap Down Cable Companies on Data Transmission Issue," *Television Digest, Inc.*, vol. 4, No. 160, p. 1, Aug. 16, 1984.

Fitzgerald, M., "Competition for Classified Ads Intensifies," *Editor & Publisher*, Apr. 28, 1990.

Armstrong, L., "Just a Phone Call Away," *Business Week*, p. 149, Sep. 17, 1990.

Technical Briefs, "Telephone resume service at the Sun," *Editor & Publisher*, Oct. 20, 1990.

Technical Briefs, "Videotex services close at Omaha daily, elsewhere," *Editor & Publisher*, Mar. 9, 1991.

Shapiro, E., "Electronic Ads Offered by USA Today, Prodigy," *New York Times*, Apr. 18, 1991.

(List continued on next page.)

*Primary Examiner*—Roy N. Envall, Jr.
*Assistant Examiner*—Stephen R. Tkacs
*Attorney, Agent, or Firm*—Townsend and Townsend

[57] ABSTRACT

A computerized classified ad system and method. The system comprises a data processor including means for creating an ad database comprising a plurality of ads, each ad containing text data describing an item to be made available through the system. In a first aspect, the data processor also includes means for receiving profile data describing an item sought from others through the system, and for comparing the profile data to the ads and for generating text output data when matches are found. An interactive voice response system converts the text output data into a voice message. In a second aspect, the data processor includes means for creating a want ad database comprising want ads that contain data describing items sought through the system and delivery data such as a buyer's phone number. When a new ad is placed in the ad database, it is also compared to the want ads. If a match is found, the system generates output data that includes the new ad and the delivery data for the matching want ad.

17 Claims, 9 Drawing Sheets

OTHER PUBLICATIONS

"Directory of Newspaper Voice Services," *The 4th Medial Journal*, May, 1991.

"Soon, Homes May Need Just Fiber-Optic Cable," *New York Times*, Aug., 1991.

"RE/MAX offers real-time real estate," *Voice Processing Magazine*, Oct., 1991.

"Microsoft co-founder Paul Allen becomes major investor in SureFind Classifieds by Telephone," *SureFind Press Release*, Aug. 6, 1992.

"KIRO Television, SureFind Classifieds form partnership to offer nation's first interactive television programming," *SureFind Press Release*, Nov. 12, 1992.

"SureFind Classifieds by Telephone named '93's Most Innovative Program in information Services industry," *SureFind Press Release*, Jan. 22, 1993.

"The Select Series: Carselect, Homeselect and Rentselect Brings Classified Buyers and Sellers Together," *The Select Series Overview*, Brite Communication Services Brochure, released by Editor and Publisher Telecommunications Conference, San Francisco, Calif., Mar. 16 or 17, 1993.

"Product Overview" Brite Communication Services Brochure, released at Editor and Publisher Telecommunications Conference, San Francisco, Calif., Mar. 16 or 17, 1993.

Prinzing, "A $5M Challenge to Newspapers' Grip on Classifieds," *Puget Sound Business Journal*, vol. 12, No. 30, pp. 1, 14 and 23, Dec. 16, 1991.

SureFind Brochure, "Introducing SureFind Classifieds by Telephone," Feb., 1992.

Northwest Real Estate Preview, vol. I, Issue 8, p. 17, Feb. 15, 1992.

"Seattle Startup Gives JOA Dailies a Wakeup Call," *Audiotex Now*, vol. VI, No. 5, May, 1992.

Richards, B., "Classified Rival is Hampered by Newspapers," *Wall Street Journal*, May 27, 1992.

Gianturco, M., "Smart Answering Machines", *Forbes Magazine*, p. 192, Jun., 1992.

Perry, S., "A New Home Shopping Network, In Seattle, House Hunters Can Get Classified Ads by Telephone," *The Washington Post*, Jun. 13, 1992.

Brackey, H., "Seattle House Hunters Can Shop by Phone," *USA Today*, Jun. 19, 1992.

Stein, M. L., "Ad Dispute," *Editor & Publisher*, p. 16, Jun. 20, 1992.

Conniff, M., "The Leading Edge," *Editor & Publisher*, p. 37, Jun. 20, 1992.

"Talking Homes in Kirkland? Only on SureFind Classifieds by Telephone Tour!", *SureFind Press Release*, Jun., 1992.

"Seattle Newspapers, SureFind TM Clash Over Competitive Classified Business," *Newspaper & Voice*, vol. 1, No. 7, p. 8, Jul., 1992.

"U.S. West Cellular, SureFind Classifieds Team Up to Offer Fast, Powerful Service to Cellular Customers," *SureFind Press Release*, Sep., 1992.

"Richard A. Galanti, Paul Allen elected to Board of Directors for EC Corp." *SureFind Press Release*, Sep., 1992.

"FIFO Fax System Approved," *Voice Power Review*, p. 14.

"Berkeley Gets Patent For Fax to Speech," *Voice Power Review*, p. 14.

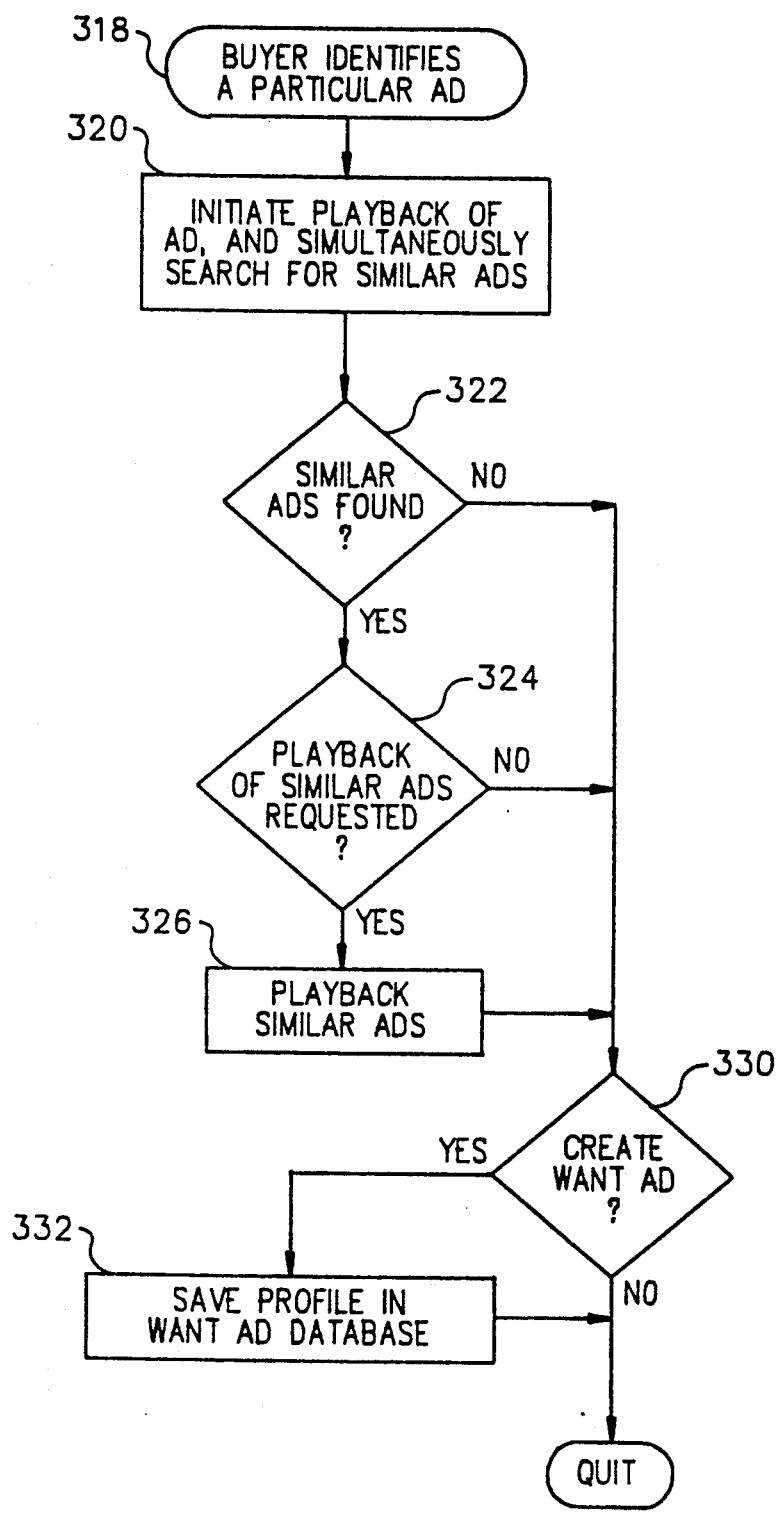

COMPUTER-BASED CLASSIFIED AD SYSTEM AND METHOD

RELATED APPLICATION

This application is a continuation-in-part of pending prior application Ser. No. 07/819,484 filed on Jan. 19, 1992, the benefit of the filing date of which is hereby claimed under 35 U.S.C. §120.

FIELD OF THE INVENTION

The present invention relates to a computerized classified ad system.

BACKGROUND OF THE INVENTION

In the well known classified ad system used in most newspapers, a seller may place an ad offering an item for sale. The ad includes a description of the item, and a phone number or other information permitting a potential buyer to contact the seller. The ad then appears in the classified ad section of one or more editions of the newspaper, indexed according to the nature of the item offered for sale, e.g., real estate, automobile, etc. A potential buyer can read the classified ads in the newspaper, and then contact the sellers of any items that appear to match the buyer's need. This system is used not only for buy-sell transactions, but also for the leasing of real estate, for employment, for services offered, and for miscellaneous other matters.

The problems inherent in the above described classified ad system are well known and, for the most part, are taken for granted. A basic problem is that buyers must often scan a large number of ads to identify a relatively small number of items that may meet their needs. A second problem relates to timing; i.e., by the time that the buyer is able to contact the seller, the item may have already been sold. In addition, if a buyer does not locate a suitable item in a given day's newspaper, the buyer must in general do a complete search of the following day's newspaper, since ads are generally not segregated based upon whether they have been newly placed.

An attempt has been made to address some of the limitations of newspaper classified ads through the use of voice mail systems in which sellers' ads are stored as individual voice mail messages. A separate index is created, the index breaking the voice ads down into categories in a manner similar to the categories used in newspaper classified ads. For example, an ad to sell an automobile might be placed in a category "auto for sale," and perhaps a subcategory indicating the car manufacturer. A buyer calling such a system specifies the categories in which he or she is interested, using touch tones, and then listens to the voice ads in the specified categories.

The basic problem with voice mail classified ad systems is the fact that the voice ads themselves are not searchable. Only the separately created index can be used by a buyer to locate ads meeting specified criteria. Because of the need to create a separate index, there may be a significant delay between when a seller calls an ad into the system, and when a buyer is able to retrieve the ad.

SUMMARY OF THE INVENTION

The present invention provides a computer based classified ad system and method that is significantly more convenient and efficient than traditional newspaper classified ads and their voice mail counterparts.

In one aspect, the classified ad system of the present invention comprises data processing means including means for creating an ad database comprising a plurality of ads. Each ad contains text (as opposed to voice) data describing an item to be made available through the system, such as property offered for sale or lease, services available, employment available, etc. The data processing means further includes means for receiving profile data describing an item sought from others through the system, such as property desired for purchase or lease, services desired, or employment sought. Means are provided for comparing the profile data to the ads in the ad database, to determine if any of the ads match the profile and, if so, for generating text output data comprising such matching ads. The classified ad system also includes an interactive voice response system comprising means for storing words and/or phrases in voice form, means for receiving the output data from the data processing means, and means for assembling a voice output message corresponding to the output data from the stored words and/or phrases. In a preferred embodiment, interactive voice response system is coupled to a telephone network, so that the voice message can be delivered to a buyer or the like via a telephone network.

In another aspect, the data processing means includes means for creating an ad database, as described above, and also includes means for creating a want ad database comprising a plurality of want ads. Each want ad comprises description data describing an item sought from others through the system, such as property desired to purchase or lease, services desired or employment sought. Each want ad also includes delivery data indicating how output from the system relating to the want ad should be delivered. The want ad database has no analog in the conventional newspaper based classified ad system. The data processing means also includes update means that responds to the receipt of a new ad by storing the new ad in the ad database, and by comparing the new ad to the want ads in the want ad database, to determine if any of the want ads match the new ad. If a match is determined to exist, the update means generates output data that includes the new ad and the delivery data for the matching want ads.

For the case in which the classified ad system of the present invention is used for buy-sell transactions, such as the sale of real estate, the ad database can be viewed as comprising ads placed by sellers, while the want ad database can be regarded as want ads placed by potential buyers. As outlined above, each time that a seller places a new ad in the system, the system compares the new ad to the buyer's want ads. When a match is found, the system generates output data that includes the new ad, plus delivery data from the matching want ads. The delivery data may comprise the phone numbers (voice or fax) of the buyers who place the want ads.

In a preferred embodiment, the classified ad system also comprises an interactive voice response system coupled to a telephone network. The interactive voice response system receives the output data generated by the update means, electronically dials the telephone number via the telephone network, and transmits at least a portion of the new ad to buyer, at the phone number contained in the matching want ad.

The significant advantages provided by the present invention are apparent from the above description. In contrast to the conventional newspaper system, the system of the present invention does not require the buyer to scan a large number of ads, or to repeatedly scan new editions of the newspaper. In the first mentioned aspect of the invention, the ability to search all of the information in an ad using conventional text database techniques is combined with the convenience of voice output. Further, because there is no separate index creation step, new ads are instantly available, creating a real time system. In the second mentioned aspect, the buyer simply places a want ad in the system. Thereafter, whenever a seller places a new ad, the buyer may be automatically and immediately notified of the contents of the new ad. Essentially, the system of the present invention assembles a customized publication (fax) or audio production (voice) for the buyer in real time.

BRIEF DESCRIPTION OF THE DRAWINGS

FIG. 9 is a flow chart illustrating the steps implemented to provide information on an item identified by an ad number and similar items in the database, and to define a buyer profile modeled on the data in the ad identified by the ad number.

DETAILED DESCRIPTION OF A PREFERRED EMBODIMENT

In the following description, it will be assumed that "sellers" wish to sell property (real estate, automobiles, etc.) to "buyers." However, the present invention is equally applicable to the leasing or renting of real or personal property, to employment (i.e., listing of positions available or positions wanted), to the offering of services, to locating persons with specified knowledge or interests, etc. In general, the system of the present invention can be applied to any field in which conventional classified ads are useful.

Figure 1:
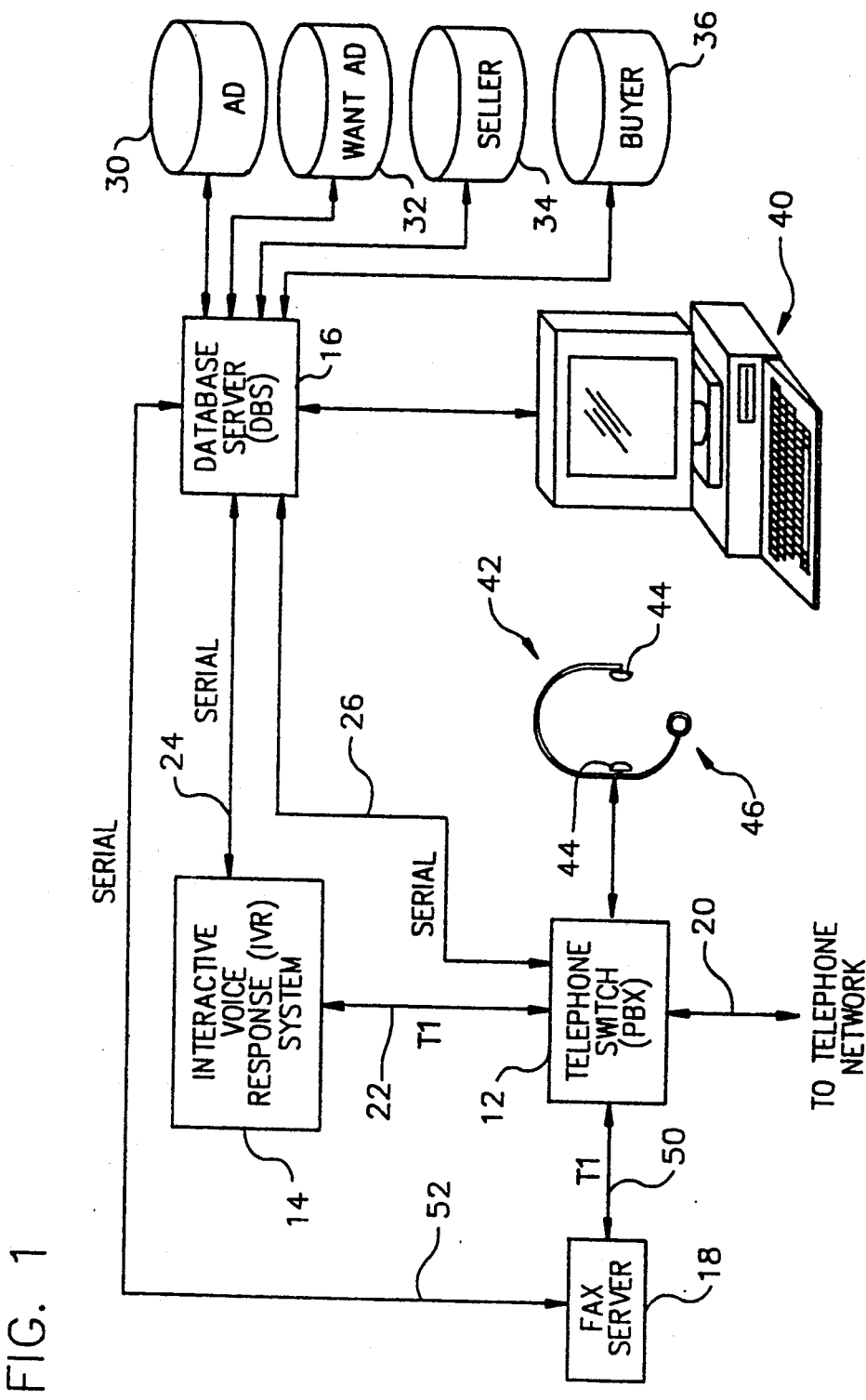
FIG. 1 is a block diagram of one preferred embodiment of the classified ad system of the present invention.

One preferred embodiment of the present invention is illustrated in block diagram form in FIG. 1. This configuration comprises a telephone switch such as PBX (private branch exchange) 12, an interactive voice response (IVR) system 14, a database server (DBS) 16, and a FAX server 18. PBX 12 is connected to one or more telephone lines 20 through which users (buyers and sellers) may communicate with the system, either by voice or fax. A suitable PBX is the Summa/Four switch available from Summa. In general, any switch capable of responding to control by an external computer may be used.

IVR 14 is a computer specialized for storing digital audio scripts, and for playing back such scripts in response to digital or touchtone inputs. IVR 14 is coupled to PBX 12 via T1 telephone line 22, such that the IVR can be coupled directly to a user who calls the system via telephone line 20. However, in a preferred implementation of the present invention, the IVR preferably includes the ability to concatenate individual words or phrases to produce voice output.

An IVR with concatenation ability is to be contrasted with a simple voice mail system. In a voice mail system, one can store a number of voice scripts, and means for permitting a user to access different scripts depending upon touch tones or other data input by the user. Each script, however, is a complete message, and cannot be further broken down. This limitation means that the individual words and other data within the script are not searchable. In contrast, in an IVR system with concatenation capability, individual words and/or phrases are stored in voice form, while the messages that will be built up from such words and phrases are stored in a conventional text-type database. When a message from the database is to be converted into voice form, the IVR retrieves the voice corresponding to each word or phrase, and concatenates these individual voice segments into an output voice message. Suitable IVR's with concatenation ability are the Voice Processing Series (VPS) models available from Periphonics.

DBS 16 is a general-purpose computer programmed for database operations. In the illustrated embodiment, DBS 16 manages four text (as opposed to voice) databases: ad database 30, want ad database 32, seller database 34, and buyer database 36. Ad database 30 comprises an electronic equivalent of the classified ads typically placed by sellers. Want ad database 32 comprises a collection of "want ads" placed by potential buyers. Each want ad describes the property sought by that buyer. Seller database 34 lists the sellers that have registered to use the system, while buyer database 36 lists the buyers that have registered to use the system. The seller and buyer databases may be regarded as extensions of the ad and want ad databases, respectively.

In a preferred embodiment of the invention adapted for the buying and selling of residential real estate, the fields in the ad and want ad databases include the following:

| Ad Database | Want Ad Database |
| --- | --- |
| Geographic area where property is located | Geographic area desired |
| Asking price | Target price |
| Number of bedrooms | Number of bedrooms desired |
| Number of bathrooms | Number of bathrooms desired |
| View? | View required? |
| Large yard? | Large yard required? |
| Garage? | Garage required? |
| Basement? | Basement required? |
| Fireplace? | Fireplace required? |
| House style | |
| Deck? | |

The fields listed above are illustrative only, and many other combinations could obviously be used to suit a particular application. A question mark after a field name indicates that the field contains either a yes or no, or equivalent data. Each of the fields in the ad database from "Geographic area" through "Fireplace?" have corresponding fields in the want ad database. These fields are referred to as "matching" fields, since they are used to match ads to want ads, as further described below. The last two fields listed for the ad database have no corresponding fields in the want ad database. These are referred to as "information" fields. The information fields are not used for matching ads to want ads, but represent additional information that can be provided to buyers concerning property for sale.

DBS 16 is coupled to IVR 14 via serial link 24, and to PBX 12 via serial link 26. The DBS includes terminal 40 through which an operator can interact with and control the DBS. Terminal 40 may be a conventional personal computer. The operator of terminal 40 wears headset 42 that includes headphones 44 and microphone 46. The headset is coupled to PBX 12, so that the operator can engage in conversations with callers via the PBX and telephone line 20.

FAX server 18 is coupled to PBX 12 via telephone line 50, and to DBS 16, via serial line 52. The FAX server may be a conventional personal computer with a fax board.

Figure 2:
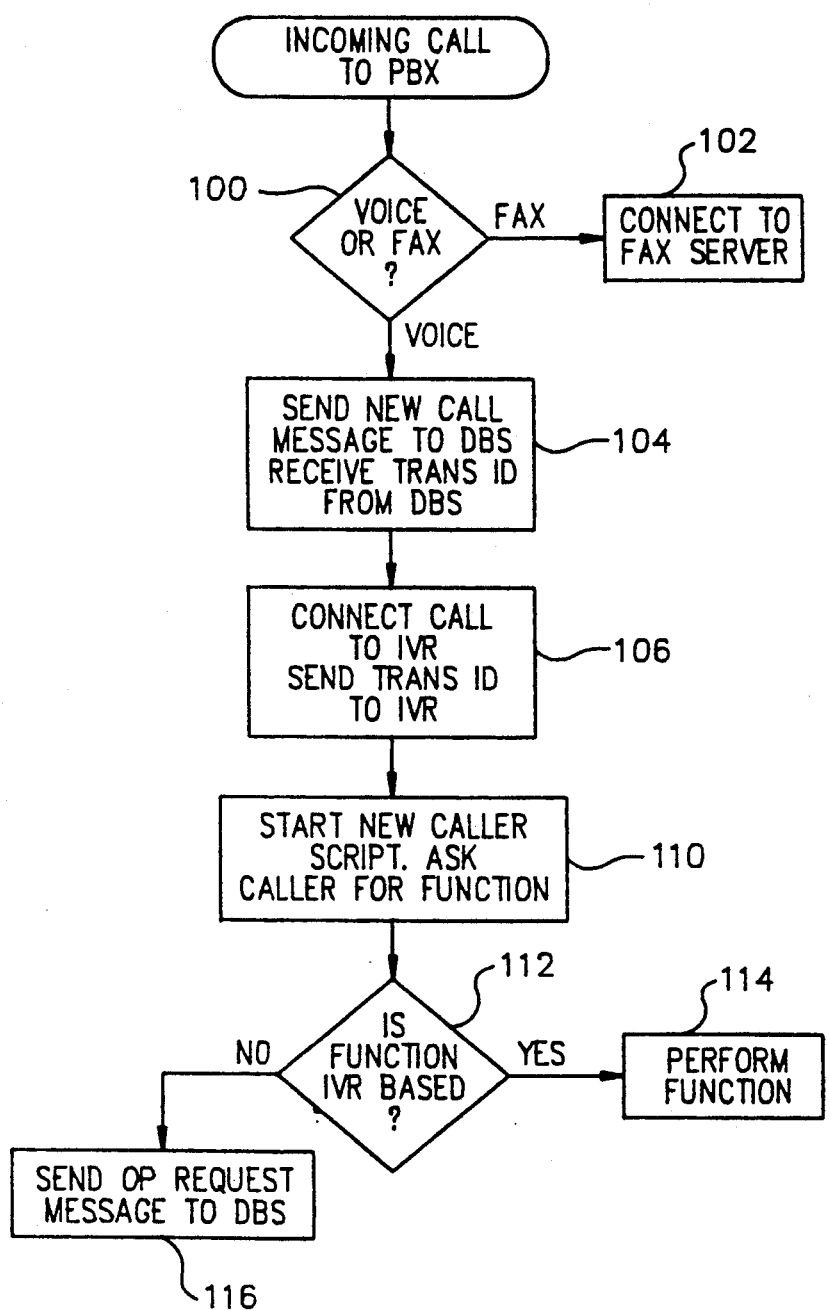
FIG. 2 is a flow chart showing the handling of an incoming call.

The operation of the system shown in FIG. 1 is outlined in the flow charts of FIGS. 2–8. As indicated in FIG. 2, the operation of the system is triggered by receipt of an incoming call to the PBX via telephone line 20. In step 100, the PBX first determines whether the incoming call is voice or fax. If fax, then step 102 connects the incoming call to fax server 18 via telephone line 50. The fax server receives the fax, and the fax may then be printed by a printer coupled to FAX server 18 or to DBS 16. As described further below, experienced sellers (i.e., real estate agents) may use fax rather than voice to transmit ads to the system for placement in the ad database.

If the incoming call is voice, then step 104 is executed. In this step, the PBX sends a message to DBS 16 via serial line 26, indicating that a new call has been received. In return, the DBS sends back a transaction identifier (TransId) that will be used to uniquely identify this call. In step 106, the PBX then connects the call to the IVR via telephone line 22, and transmits the transaction identifier to the IVR via telephone line 22, using touch tone signals.

The steps in blocks 100-106 in FIG. 2 are performed by PBX 12, while the remaining steps in this FIGURE are performed by IVR 14. In response to receipt of the transaction identifier from the PBX, the IVR in step 110 plays a pre-stored new caller voice script, and transmits this script to the caller via PBX 12 and telephone line 20. This script may include any introductory information, recently added features of the system, instructions on how to use the system, etc. The script then asks the caller to identify a desired function, for example by pressing designated touch tone keys on the caller's telephone. Block 112 then analyzes the function that the caller has requested, and routes control accordingly 114, 116.

The principal functions that the caller may request depend upon whether the caller is a seller or buyer. If the caller is a seller, then the caller can ask to place a new ad in the system. If the caller is a buyer, then the caller can ask the system to search for ads that match its needs, and to place a new want ad. In a particular implementation, numerous other functions could be selected at this point. For a seller, such additional functions could include changing an existing ad, renewing or cancelling an ad, playing back an ad previously placed, and modifying information concerning the seller itself, such as its phone number or address, etc. For a buyer, such additional functions could include modifying, cancelling or renewing a previously placed want ad. These additional functions will not be described further because they are not central to the present invention, and because they are enhancements that can be routinely implemented by those skilled in the art, based upon the description of the basic functions set forth below.

If the incoming caller identifies itself as a seller wishing to place a new ad, then the IVR identifies the caller's requirement as pertaining to a non-IVR based function, and sends an operator request message to DBS 16 via serial line 24, as shown in block 116 of FIG. 2. In response to the operator request message, the DBS begins prompting the operator at terminal 40 for information relating to the ad. In turn, the operator relays these requests to the seller via headset 42 and switch 12, receives the seller's responses via the same path, and inputs such responses to DBS 16, to create a new ad in ad database 30. Although this step could be automated using the IVR, it is generally preferable to use a human operator as an interface, because of the amount of variability involved in placing an ad, explaining to the seller the options available, etc.

Figure 3:
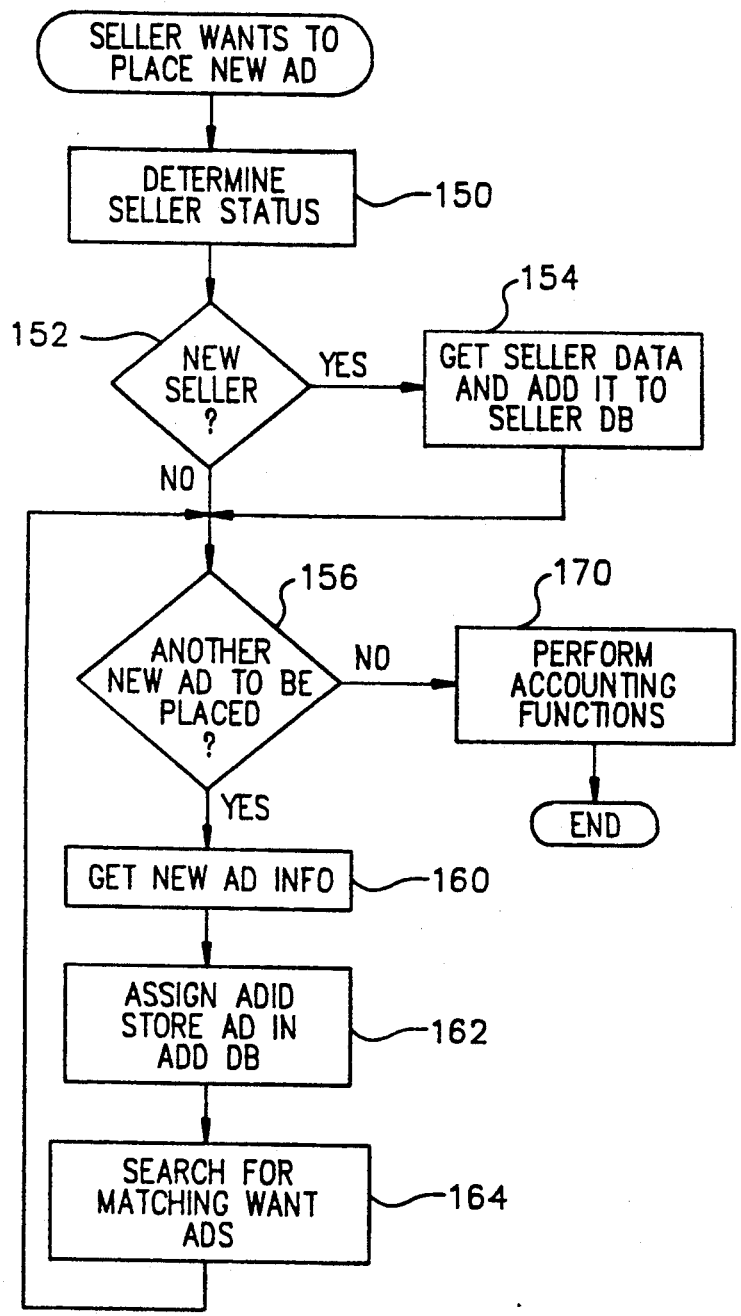
FIG. 3 is a flow chart illustrating the placement of a new ad by a seller.

FIG. 3 provides further details concerning the steps used to create a new ad in ad database 30. In step 150, the operator asks the seller to identify itself, such as by supplying a seller ID or other identifying information. The operator then checks seller database 34, to determine whether the seller is already registered in the system. If the caller is a new seller 152 then the operator obtains information from the seller in block 154, and the new seller is added to the seller database. In block 156, the operator asks the seller if it wishes to place a new ad, or another new ad, in the system. Assuming that the answer is yes, the operator obtains the information relating to the new ad in step 160. The information requested from the seller corresponds to the fields of the ad database described above, i.e., geographic location, price, bedrooms, bathrooms, etc. DBS 16 then assigns an ad identifier (AdId) 162, and the new ad with its AdId is stored in ad database 30. DBS 16 then searches want ad database 32, in step 164, to determine if any of the previously stored want ads in want ad database 32 match the new ad just received from the seller. This step could of course be performed either before or after the new ad is actually placed in the ad database.

Figure 4:
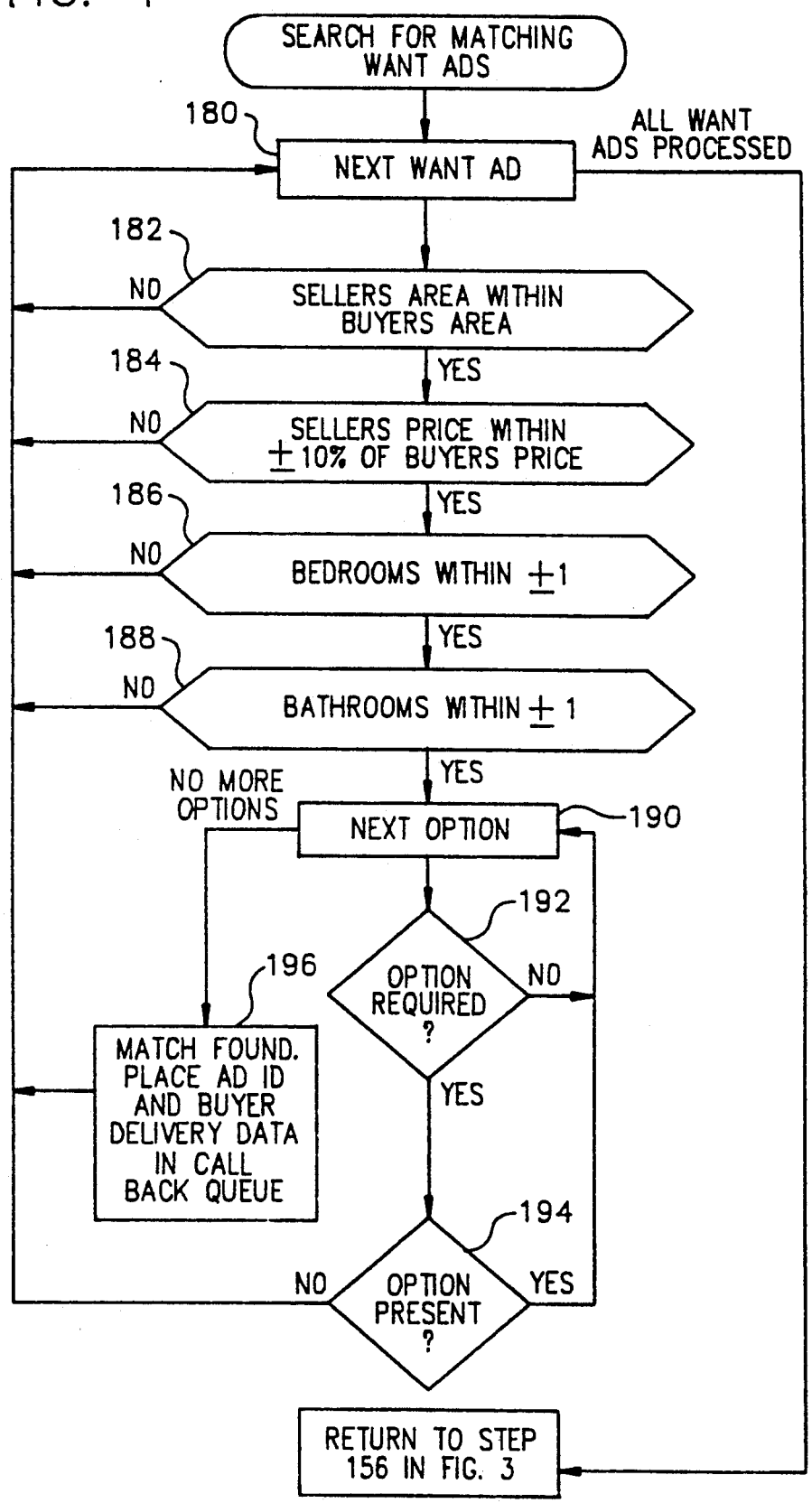
FIG. 4 is a flow chart illustrating a search for matching want ads.

One preferred technique for performing this matching step is outlined in FIG. 4. In this approach, the matching fields in the ad and want ad databases are broken down into basic fields (geographic area, price, bedrooms and bathrooms) and option fields (all remaining matching fields). In step 180, the first or next want ad is retrieved from the want ad database. Steps 182, 184, 186 and 188 then compare the basic fields of the new ad to those of the retrieved want ad. For example, step 182 compares the seller's geographical area from the new ad to the buyer's geographical area from the want ad. If the seller's area is not within the buyer's area, then there is no match, and control returns to block 180 to retrieve the next want ad. Steps 184, 186 and 188 perform similar tests for price, number of bedrooms and number of bathrooms. For price, the seller's asking price must match the buyer's target price within plus or minus 10%, while for bedrooms and bathrooms, the matching criteria is plus or minus one. These "tolerance" perimeters can be varied, and could also be specified by the buyer for each want ad.

If the basic field tests in blocks 182-188 are all successfully negotiated, then the option fields are tested. These fields include view, yard, garage, basement, fireplace, etc. For each option, if blocks 192 and 194 determine that the want ad requires the option but that the option is not present in the seller's ad, there is no match, and processing returns to step 180. On the other hand, if a given option is not required, or is required and present, processing returns to block 190 to test the next option.

When all options have been successfully tested, a match has been found. In this case, in step 196, the AdId of the new ad is placed in a "callback queue", together with "delivery" information corresponding to the matching want ad. The delivery information preferably includes both the buyer's phone number, together with time information specifying the times that the phone number should be called. The delivery information may be contained in the want ad itself. Alternatively, the want ad may contain a buyer ID which is then used to retrieve the delivery information from buyer database 36. When processing of the want ad database is complete, control returns to step 156 in FIG. 3. At this point, the operator determines if the seller has another new ad to place. If so, then the above described steps are repeated. If not, then processing proceeds to block 170 to perform various accounting functions, and the placement of the ad by the seller is complete.

As mentioned above, provision may also be made for experienced sellers such as real estate agents to fax ads to the system via PBX 12 and FAX server 18. In this case, the fax is printed or displayed to the operator of terminal 40, and the operator then inputs the information shown on the fax to create a new ad in ad database 30. In this case, the steps shown in FIG. 4 are again carried out, to determine if the newly placed ad matches any previously stored want ads.

Figure 5:
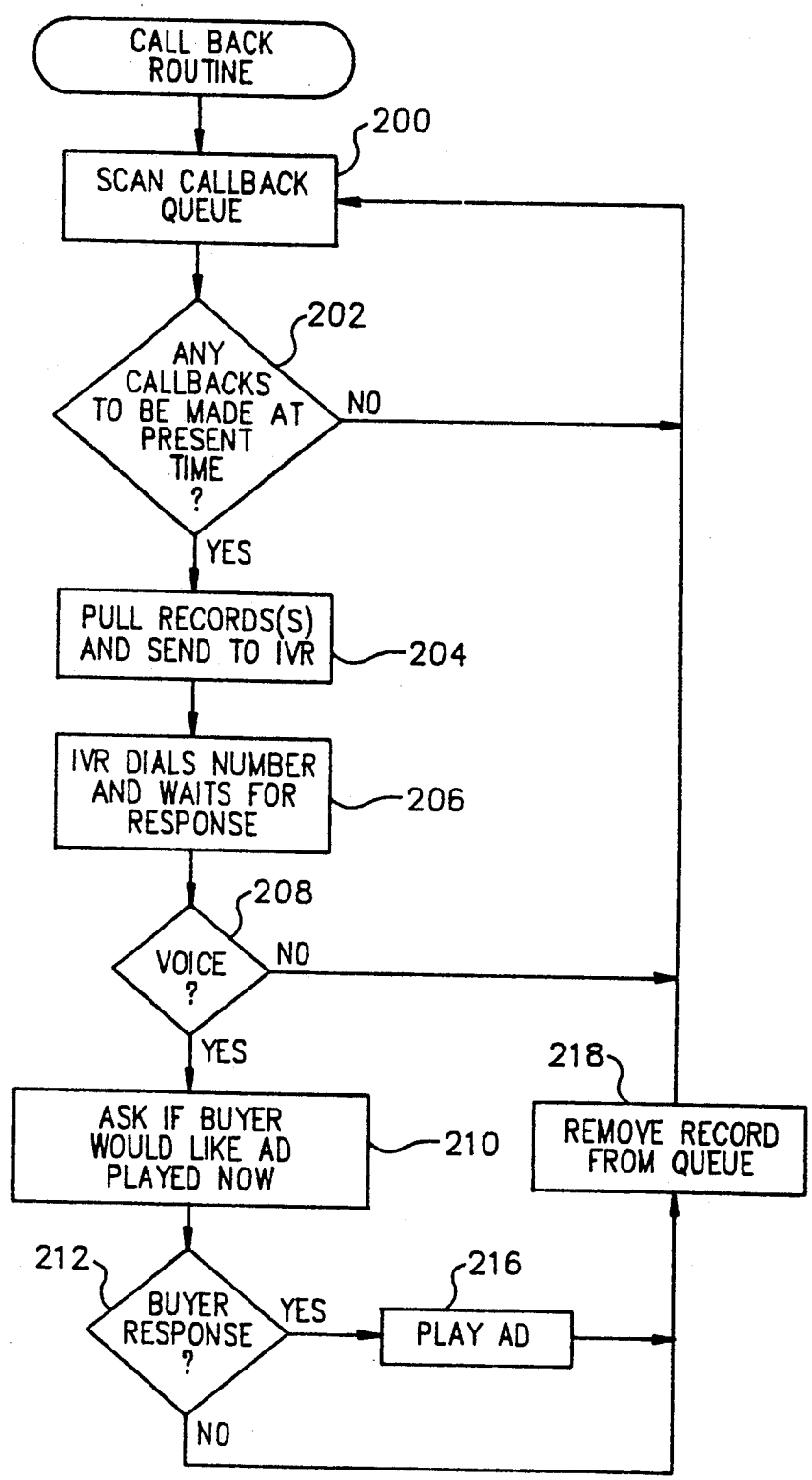
FIG. 5 is a flow chart illustrating the callback routine.

FIG. 5 illustrates the callback routine that processes the records placed in the callback queue in step 196 of FIG. 4. In step 200, the DBS scans the callback queue, to determine if any callbacks are scheduled to be made at the present time. As previously described, each callback record includes the buyer's phone number and time information concerning when callbacks should be directed to that phone number. Block 202 determines if the time information in any callback records matches the current date and time.

For callback records in which the time information matches, step 204 pulls such records from the callback queue, and sends them (in text form) to the IVR. In step 206, the IVR dials the buyer's phone number contained in the callback record, and waits for a response. If a voice response is not received, then the IVR sends a corresponding message to the DBS. The DBS then marks the time of the attempted callback in the callback queue record, so that a set period of time can be established between callback attempts in step 202. The callback routine resumes scanning in step 200. If a voice response is received 208, then in step 210, the IVR sends a voice message to the buyer via the PBX, asking the buyer to make a predetermined touch tone response if the buyer would like the ad played at the present time. If the buyer's response 212 is positive, then the IVR assembles a voice message by identifying the individual words and phrases contained in the ad, retrieving the digital voice records corresponding to such words and phrases, and concatenating the individual voice records into a single message. This message is then relayed 216 to the buyer in voice form via telephone switch 12 and telephone line 20. When ad playback is complete, the IVR sends a corresponding message to the DBS, and the DBS removes the callback record from the queue in step 218, and then resumes scanning.

If the buyer does not wish to hear the ad played back at the present time, the buyer may provide a negative response. In this case the ad is not played back, but is removed from the callback queue, since the buyer has been notified that a matching ad exists in the system. The buyer may call in at a later time to retrieve the matching ad, as described immediately below. An option could also be provided to enable a buyer to request receipt of the ad via fax.

Figure 6:
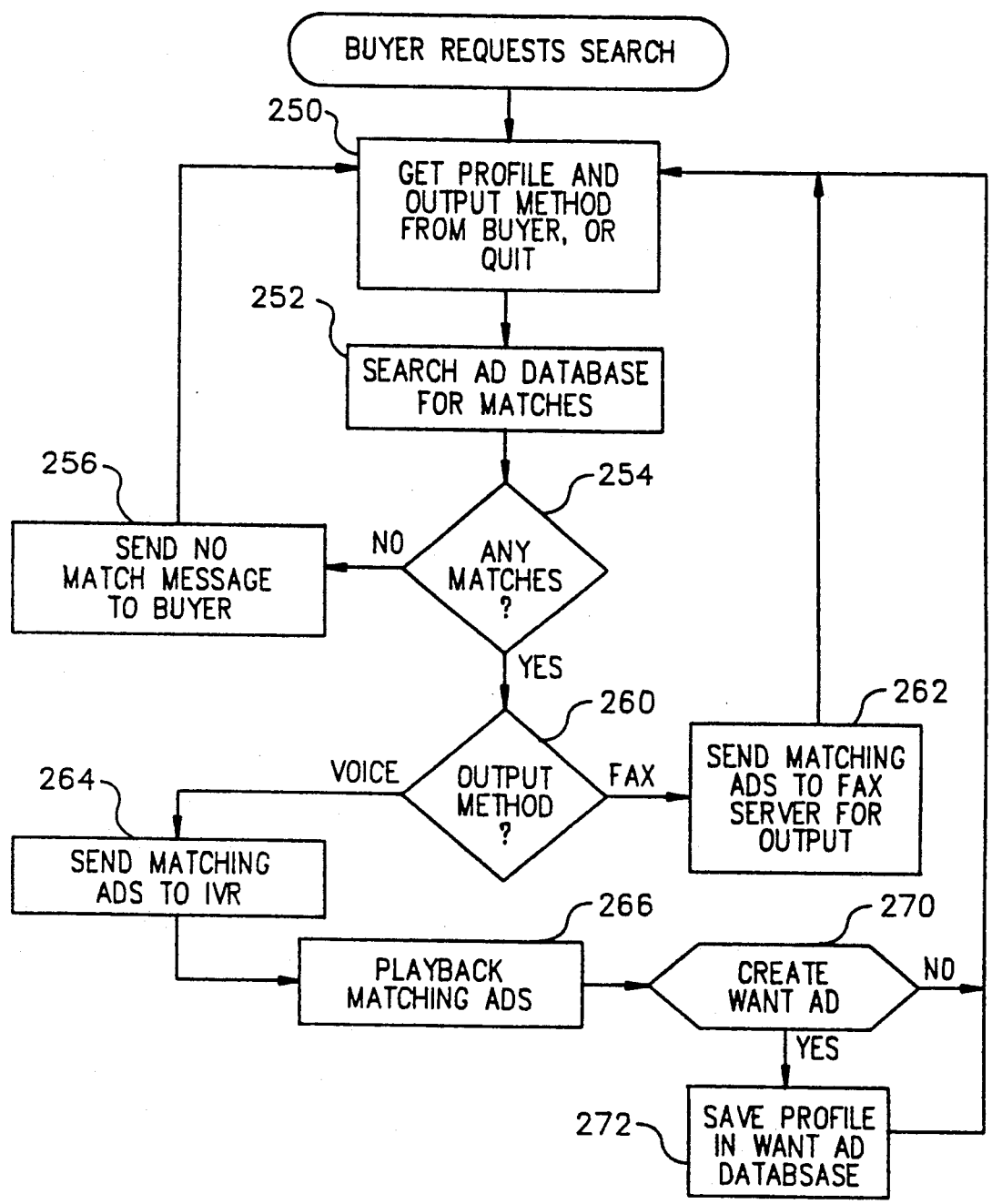
FIG. 6 is a flow chart illustrating the steps performed when a buyer requests a search.
Figure 7:
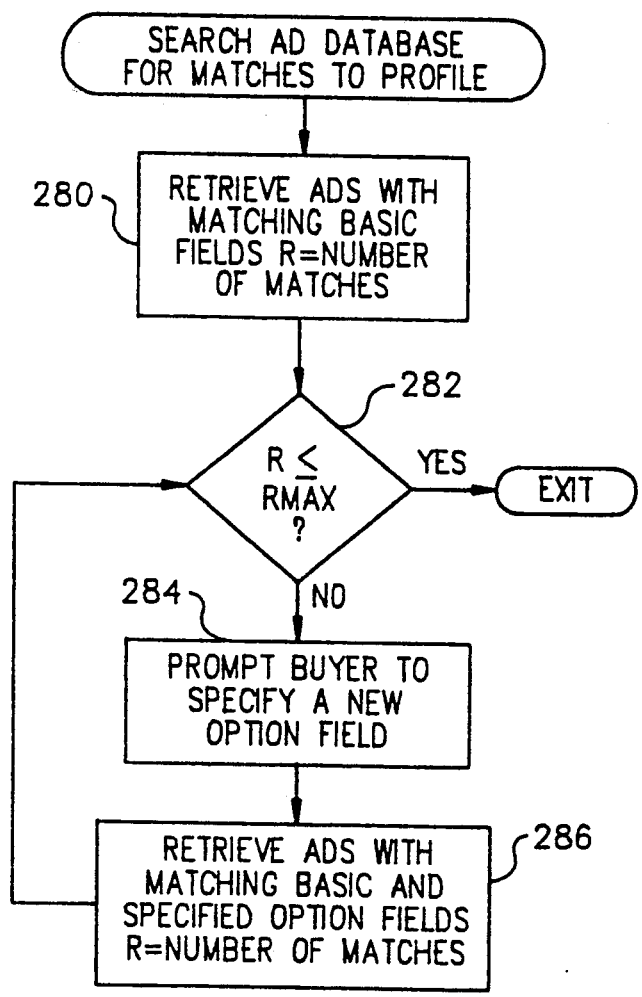
FIG. 7 is a flow chart illustrating a search of the ad database for ads matching a profile.

FIGS. 6 and 7 illustrate the steps performed when a buyer calls the system to request a search or to place a want ad. In general, a buyer's search request can be handled by an operator at terminal 40, as in the case of a seller placing an ad, or by IVR 14. The following discussion will assume that the buyer's search request is routed through the operator of terminal 40. However, analogous functions could be handled by the IVR, for systems in which a lower degree of flexibility is suitable.

Referring again briefly to FIG. 2, for the case of a buyer's search request to be handled by an operator, IVR 14 will send an operator request message to DBS 16, as shown in step 116. Referring now to FIG. 6, the operator at terminal 40 will then obtain information from the buyer, in step 250, in order to create a "profile" for the search request. In general, a "profile" corresponds to a want ad record, except that the profile has not yet been stored in the want ad database. Thus the information requested by the operator will correspond to the fields of the want ad database described above. The operator also obtains an output method from the buyer, e.g., voice or fax.

For the case in which the buyer's search request is being handled by the IVR, the IVR would at this point send the profile and the output method to DBS 16. However, for the case being considered in which the buyer's search request is handled by the operator, the DBS already has this data. In either case, the DBS proceeds in step 252 to search ad database 30 for ads matching the profile. A preferred matching technique is described below. Block 254 then determines whether any matches have been found. If not, a suitable message is sent to the buyer in step 256, via either the operator or the IVR. Control then returns to block 250 to permit the buyer to specify a different profile or quit.

If step 254 determines that matches have been found, then step 260 determines the output method that the buyer has specified. If fax output has been specified, then step 262 sends the matching ads to FAX server 18 for output via PBX 12. Control then returns to step 250. If voice output has been specified, then step 264 sends the matching ads to IVR 14. In step 266, the IVR proceeds to play the matching ads back to the buyer. This process is also further described below. In step 270, the buyer is then asked whether it wishes to convert the currently searched profile into a want ad. If the buyer's response is affirmative, then the IVR sends a corresponding message to DBS 16, and the DBS proceeds to store the profile as a new want ad 272 in want ad database 32. In both cases, control then returns to step 250.

FIG. 7 provides additional details concerning a preferred technique for searching the ad database for matches, as performed in step 252 of FIG. 6. In step 280, the profile is matched to ads in ad database 30, using only the basic fields. As described above, in the embodiment being described relating to residential real estate, the basic fields are geographic area, price, number of bedrooms and number of bathrooms. The matching criteria and tolerances may be selected to be identical to those shown in steps 182-188 of FIG. 4. In step 282 of FIG. 7, the number of matching ads is compared to a maximum number RMAX. If the number of matches is less than or equal to RMAX, then the searching step is complete, and control is returned to step 254 in FIG. 6. However, for the case in which the number of matching ads exceeds RMAX, then the buyer is prompted in step 284 to specify one of the option fields not previously specified during this search. Examples of option fields are: view?, large yard?, garage?, etc. The database query is then rerun in step 286 using the basic fields and the option fields that have been specified to this point. The number of retrieved ads is again compared to RMAX in step 282, and this loop continues until the number of ads retrieved is within the RMAX limit. If this limit is never reached, then the first RMAX ads are transmitted to the buyer.

Figure 8:
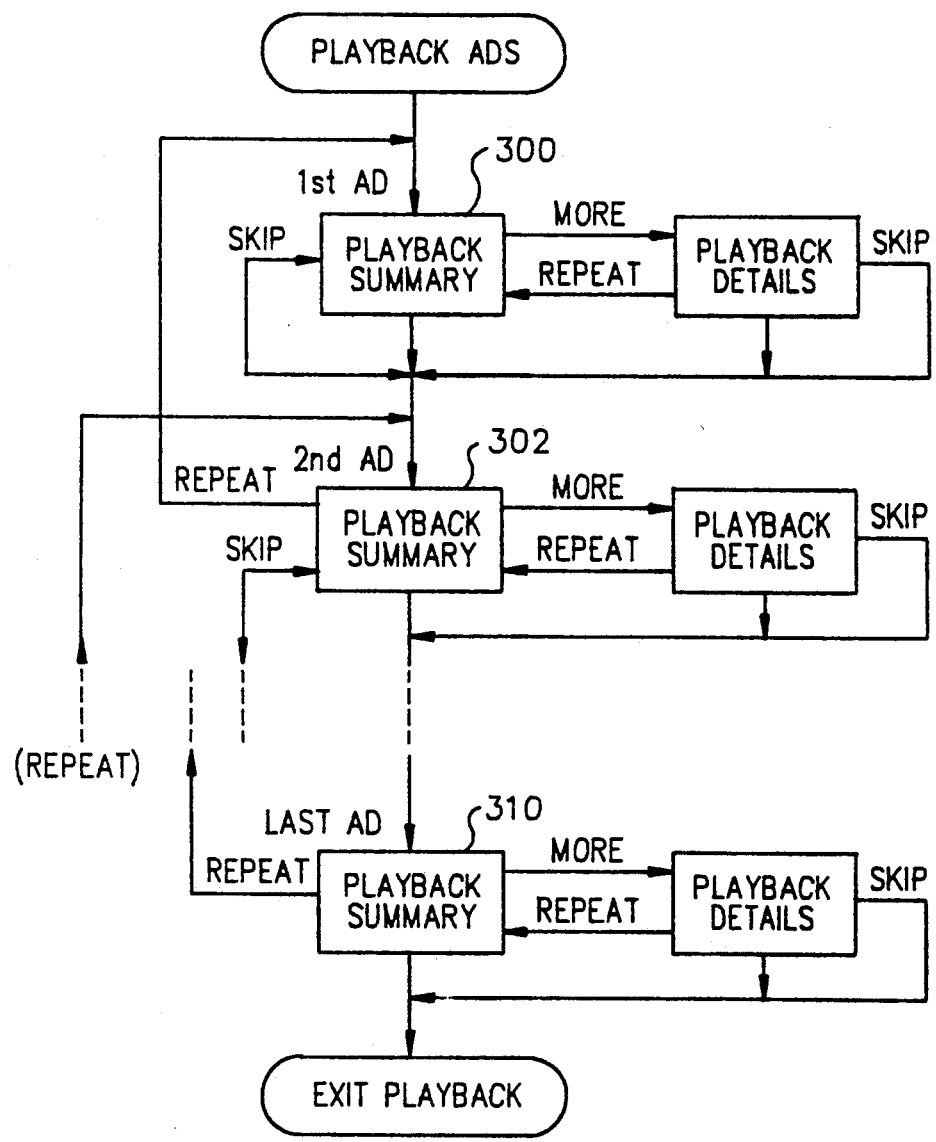
FIG. 8 is a flow chart illustrating ad playback.

FIG. 8 illustrates a preferred, interactive technique for carrying out the playback of matching ads by the IVR, in step 266 of FIG. 6. As in the case of playback of the callback queue described above, the IVR performs the playback by assembling a voice message in real time. The voice message is assembled by identifying the individual words and phrases contained in the ad, retrieving the digital voice records corresponding to such words and phrases, and concatenating the individual voice records into an output message. For the purpose of this playback, the fields in each ad are preferably separated into "summary" fields and "detail" fields. For example, summary fields could include geographic area, price and house style, and all remaining fields could be treated as detail fields. In general, the summary fields of the ads are assembled and played back sequentially 300, 302, 310, beginning with the first ad in step 300, and ending with the last ad in step 310. However, during the playback, the buyer can control the sequence using predetermined touch tone keys. For example, one touch tone key would correspond to the illustrated "More" function that causes the detail fields of the current ad to be assembled and played back. If the More function is not used, then detail fields are omitted. A second touch tone key would correspond to the repeat function, which causes either a repeat of the summary fields of the current ad if details are currently being played back, or causes the prior ad to be played back in the case of summary playout. A third key would be dedicated to the skip function which causes the playback to skip ahead to the next ad in the sequence.

A buyer calling in to use the service can obtain information about an item and can more conveniently specify the criteria to establish a want ad by taking advantage of another feature of the database system, as follows. Ads describing properties listed on the database system by sellers are assigned a unique ad number. A buyer seeing such an ad for a property that has features of interest to the buyer makes note of the ad number assigned to the property; the ad number is displayed prominently in the ad or on a yard sign on the actual property. Referring now to FIG. 2, in block 110, a buyer calling into the system responds to a request to identify the function desired by entering a request code on the telephone touch tone pad to indicate that information is desired on the property associated with the specific ad number noted by the buyer from the ad or yard sign that was seen. This request can be handled by IVR 14. The database system responds to the determination as indicated in block 112.

In response to the request code entered by the buyer, a block 114 initiates the series of steps illustrated in FIG. 9. In a block 318, the buyer responds to a verbal script requesting that the ad number be keyed into the telephone touch tone pad. After the ad number is entered and received by the system, a block 320 initiates a search for the corresponding seller's ad in the database and, once it is found, plays back the seller's ad. In addition, the system begins searching for similar ads entered by sellers, i.e., other sellers' ads that include at least the same basic field data. If other such ads are found in the database, a block 322 causes IVR 14 to play a verbal script that asks the buyer to indicate with an entry on the telephone touch tone pad whether playback of the similar ads is desired 324. If so, as indicated in a block 326, the system plays each of the similar ads to the buyer, until completed or until the buyer terminates the playback. Alternatively, the buyer may elect to receive fax copies of the ad identified by the ad number and of similar ads.

If similar ads are not found, if playback is not requested, or, after playback of similar ads is accomplished, IVR 14 transmits a verbal script to the buyer that asks if the buyer would like to create a want ad based on data in the fields of the ad corresponding to the ad number previously entered by the buyer. This step is in accordance with a block 330. Assuming that the buyer wants to enter such a want ad (as indicated by the buyer's selection of an appropriate telephone touch tone pad key), a block 332 causes the buyer's want ad profile to be saved in the database. Before entering the profile as a want ad, the buyer may choose to edit one or more of the data fields in order to "fine tune" the want ad profile before it is saved. Editing of the profile is done in response to verbal prompts made by IVR 14 or with the assistance of a human operator.

The want ad number entered into the system by a buyer thus identifies an ad that serves as a model to define a want ad profile for the buyer. Much the same process of defining a buyer want ad profile modeled after data in a seller's ad identified by the ad number provided by the buyer can also be carried out with the assistance of a human operator who interacts with the buyer, instead of by interaction of the buyer with IVR 14.

As noted above, the ad number may be displayed in printed ads appearing in newspapers and other publications, or on signs, e.g., yard signs posted on the property. By calling into the system and entering the ad number, the buyer immediately obtains a description and other information about a property, by accessing the data in the fields stored in the database ad by the seller. Because it provides rapid access to the data stored in the database of the system through reference to the ad number, a printed ad or yard sign effectively becomes a talking salesman for the seller. Since the database system is interconnected to the telephone network, which includes cellular telephone networks, and because the seller ads in the database are accessible through a cellular telephone call, information about a property of interest and about similar properties is conveniently available to the buyer. This feature greatly facilitates matching the needs of a buyer with the available properties listed by sellers in the database system.

It is important to note that the present invention and all of the features described above are not limited to the sale or lease of real estate. Instead, the service and convenience provided by the database system are equally applicable for matching the requirements of parties to any transaction involving the transfer of an interest, for virtually any type of personal property. For example, it should be apparent that the present invention can also be employed in the sale or lease of used automobiles or boats.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer based classified ad system comprising:
   (a) data processing means including:
      (i) means for creating an ad database comprising a plurality of ads, each ad comprising text data in fields describing an item available through the system, a unique ad number being assigned to each ad for use with text ads distributed outside the computer based classified ad system;
      (ii) means for receiving telephone calls from an individual desiring to obtain information about a specific item available through the system, including means for processing an ad number entered by the individual via a telephone, to identify the ad for the specific item referenced in one of the text ads distributed outside the computer based classified ad system;
      (iii) means, coupled to said means for receiving telephone calls, for recalling data comprising the ad for the specific item, based upon the ad number entered by the individual; and
      (iv) means, coupled to said means for recalling data and coupled to said means for creating an ad database, for searching the database for other ads for items similar to the specific item, based on data in predefined fields of the ad for the specific item matching data in corresponding fields of the ads for the items thus determined to be similar; and
   (b) means, coupled to said data processing means, for assembling a voice output message conveying the data in the fields of the ad for the specific item over the telephone to the individual, thereby providing information about the specific item to the individual.

2. The system of claim 1, wherein the data processing means further comprise means for producing a want ad for the individual, said want ad including data in a plurality of fields that substantially correspond to the data in the fields of the ad for the specific item, said ad for the specific item thereby comprising a model for the want ad to enable matching the want ad to ads for items similar to said specific item that are subsequently created in the database.

3. The system of claim 2, wherein the data processing means further comprises means for editing the want ad to modify data in selected fields of the want ad.

4. The system of claim 2, further comprising means for calling a telephone number designated by the individual in a field of the want ad to deliver information from said subsequently created ads about such items that are similar to the specific item.

5. The system of claim 1, wherein the means for assembling also assemble a voice output message that conveys the data in the fields of the similar ads over the telephone to the individual, thereby providing information about other items similar to said specific item to the individual.

6. The system of claim 1, wherein the means for receiving telephone calls is interconnected to a cellular telephone network to receive calls from the individual that are placed on a cellular telephone.

7. The system of claim 1, wherein said means for receiving telephone calls comprises means for receiving one of a voice message and a fax message.

8. The system of claim 1, wherein said means for assembling further comprises means for conveying said data in fields of the ad for the specific item as a fax message.

9. The system of claim 8, wherein said fax message comprises a customized publication for the individual.

10. The system of claim 8, wherein said means for receiving telephone calls further comprises means for receiving and storing output preference data indicating the preferences of said individual for delivery of output from said system.

11. The system of claim 10, wherein said output preference data includes phone number data, data indicating a preferred time to call, and data indicating whether output should be a voice message or a fax message.

12. The system of claim 1, wherein each ad in the ad database comprises at least one basic field, each basic field being associated with a particular aspect of the item.

13. The system of claim 12, wherein said means for searching determines that a first ad in said database does not match the ad for the specified item if said at least one basic field of said first ad and of said ad for the specified item are not within a first specified tolerance of one another.

14. The system of claim 13, wherein said first specified tolerance has a predefined value.

15. The system of claim 13, wherein said means for receiving telephone calls further comprises means for receiving and storing said first specified tolerance.

16. A computer based classified ad system comprising:
   (a) a data processor including:
      (i) a memory storing an ad database, said ad database comprising a plurality of ads, each ad comprising data in fields describing an item available through the system, a unique ad number being assigned to each ad for use with text ads distributed outside the computer based classified ad system;
      (ii) a telephone switch device for receiving telephone calls from an individual desiring to obtain information about a specific item available through the system and for receiving at least a first ad number entered by the individual;
      (iii) a database server, coupled to said memory and to said telephone switch, for processing said first ad number, to identify the ad for the specific item referenced in one of the ads distributed outside the computer based classified ad system, for recalling data comprising the ad for the specific item, based upon said first ad number and for searching the database for other ads for items similar to the specific item, based on data in predefined fields of the ad for the specific item matching data in corresponding fields of the ads for the items thus determined to be similar; and
   (b) an interactive response system, coupled to said data processor, for assembling an output message conveying the data in the fields of the ad for the specific item over the telephone to the individual, thereby providing information about the specific item to the individual.

17. A method for providing classified ad information to an individual, comprising:

provided data processor means, including a memory and a telephone switch;

storing, in said memory, an ad database comprising a plurality of ads, each ad comprising data in fields describing an item available through the system, a unique ad number being assigned to each ad for use with text ads distributed outside the computer based classified ad system;

receiving telephone calls, using said telephone switch, from an individual desiring to obtain information about a specific item available through the system;

receiving at least a first ad number entered by the individual, using said telephone switch;

processing said first ad number to identify the ad for the specific item referenced in one of the text ads distributed outside the computer based classified ad system;

recalling data comprising the ad for the specific item, based upon said first ad number;

searching the database for other ads for items similar to the specific item based on data in predefined fields of the ad for the specific item matching data in corresponding fields of the ads for the items thus determined to be similar;

assembling an output message conveying the data in the fields of the ad for the specific item over the telephone to the individual, thereby providing information about the specific item to the individual.

* * * * *